(12) United States Patent
Rjaibi

(10) Patent No.: US 7,542,975 B2
(45) Date of Patent: Jun. 2, 2009

(54) COMPUTING FREQUENT VALUE STATISTICS IN A PARTITIONED RELATIONAL DATABASE

(75) Inventor: Walid Rjaibi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 10/872,679

(22) Filed: Jun. 21, 2004

(65) Prior Publication Data

US 2005/0021287 A1  Jan. 27, 2005

(30) Foreign Application Priority Data

Jun. 25, 2003 (CA) .................................. 2433377

(51) Int. Cl.
*G06F 17/30* (2006.01)
(52) U.S. Cl. ........................................ 707/10; 702/180
(58) Field of Classification Search ................. 707/102, 707/10
See application file for complete search history.

(56) References Cited

U.S. PATENT DOCUMENTS 5,542,089 A * 7/1996 Lindsay et al. ................. 707/2
6,029,163 A * 2/2000 Ziauddin ....................... 707/2
6,353,833 B1 * 3/2002 Bird et al. .................... 707/201
2002/0026438 A1 * 2/2002 Rjaibi et al. .................... 707/2
2002/0198867 A1 * 12/2002 Lohman et al. ................. 707/3

OTHER PUBLICATIONS

Peter J. Haas, Arun N. Swami, Sampling-Based Selectivity Estimation for Joins Using Augmented Frequent Value Statistics, 1995 IEEE, pp. 522-531.

* cited by examiner

Primary Examiner—Issac M Woo
Assistant Examiner—Johnese Johnson
(74) Attorney, Agent, or Firm—Scully, Scott, Murphy & Presser, P.C.; Kenneth Corsello, Esq.

(57) ABSTRACT

Systems, methods and program products for computing frequent value statistics such as frequent values in a column in a partitioned relational database, that may be employed across a number of nodes of a partitioned relational database and a case where a column is the single partitioning key of the database table as well as the case where the column is not the single partitioning key of the database table. The technique involves hashing column entries to a hash data set on a node, collecting the hash entries into another hash data set on a coordinating node into a combined hash data set, hashing entries from a table portion residing on the coordinating node into the combined hash data set and computing frequent value from the combined hash data set. Each hash data set is an array of counts and the combined hash data set is a combined array of counts.

16 Claims, 4 Drawing Sheets

COMPUTING FREQUENT VALUE STATISTICS IN A PARTITIONED RELATIONAL DATABASE

FIELD OF THE INVENTION

This present invention relates generally to computing frequent value statistics in a computer resource, and more particularly to computing frequent value statistics in a partitioned relational database.

BACKGROUND OF THE INVENTION

Frequent-value statistics are among the most commonly required statistics in query optimization. For a fixed number N where N>=1, the N most frequent values in a column consist of the data value having the highest frequency (that is, number of duplicates), the data value having the second highest frequency, and so forth, down to the data value having the Nth highest frequency. The corresponding frequent-value statistics consist of these "N" data values, together with the frequencies of these data values in the column. The query optimizer component of a database system uses the frequent-value statistics, in conjunction with other statistics such as column cardinality, to estimate the number of rows in a column that satisfy an equality condition or range predicate in order to select the least expensive access plan for the query. For example, consider a database table T with a single column C for which the frequency of the data values is as follows:

| Data Value | Frequency |
|---|---|
| 1 | 2 |
| 2 | 3 |
| 3 | 40 |
| 4 | 4 |
| 5 | 1 |

Suppose that the following SQL query is issued: SELECT*FROM T WHERE C=3. According to the Data Value and Frequency table above, exactly 40 rows will satisfy the predicate 'C=3'. If the frequent-value statistics are not available (or not accurate), a database query optimizer will only use the total number of rows in the table and the column cardinality (also known as the number of distinct values in the column) statistics to estimate the number of rows that would satisfy the predicate 'C=3'. In this case, there are 50 rows in the database table T (i.e., the sum of the frequencies 2, 3, 40, 4 and 1 from the Data Value/Frequency table above) and there are 5 distinct values in column C, namely 1, 2, 3, 4 and 5 (according to the Data Value and Frequency table above). Therefore, the number of rows that satisfy the predicate 'C=3' is estimated as 50 divided by 5 equals 10, an error of negative 75%. If the frequent-value statistics based on only the most frequent value (that is, N=1) are available, the number of rows that satisfy the predicate 'C=3' would be estimated as 40, without any error. This is because the value '3' is among the frequent value-statistics available to the database query optimizer and therefore its number of occurrences can be used to determine the number of rows that satisfy the predicate 'C=3'.

To accurately compute the N most frequent-value statistics, a database system typically would need to perform at least two sort operations. The first operation is to sort the column values themselves, and the second one is to sort the column values according to their frequencies. If there is an index defined on the column then the first sort operation is not necessary because the database system can use the order that the index inherently provides. Given that sort operations are very expensive, a number of algorithms and techniques have been proposed for obtaining approximations to the frequent-value statistics in the context of traditional or non-partitioned databases.

On the other hand in a partitioned relational database, such as a share-nothing parallel database management system where the table data is partitioned across several shared-nothing processing nodes, computing the frequent-value statistics efficiently is more challenging, whether or not there is an index defined on the column. A scheme that simply computes the N most frequent values on each processing node and then sorts the per node results to obtain the overall N most frequent values (i.e., across all nodes) can lead to wrong results.

For example suppose that a particular column value is the $(N+1)^{th}$ most frequent value on a node A and is, say the $(N+2)^{th}$ most frequent value on a node B. Further suppose that the overall (from node A and from node B) number of occurrences of this column value is such that it becomes one of the overall N most frequent values (i.e., across all nodes). Obviously, this column value would have been missed by the above scheme because it only computes the N most frequent values on each processing node. The above scheme can surely lead to correct results only when the column for which the N most frequent values are being computed is the single partitioning key of the database table. This is because the same column value can not be present on more than a single processing node if the column is the single partitioning key of the database table.

Another technique used to compute the most frequent values in a column in a partitioned relational database environment is sampling. For example a node may be selected as being representative of all nodes and frequent value statistics for that selected node calculated and used as representative of all nodes. The difficulty with a sampling technique is the accuracy of the result diminishes with the sample size. In order to improve the quality of the computation the sample size has to be increased to larger size. The increase in sample size leads to a requirement for more processing time and associated resource consumption. Sampling may also lead to erroneous results when the sample data selected is atypical of the data value distribution across nodes. As a result the estimated frequent value statistics may vary considerably from the actual value.

It is therefore desirable to have a technique for computing the most frequent values in a column in a partitioned relational database which is efficient and provides a reliable estimate of the frequent values across all nodes in which the table data is stored.

SUMMARY OF THE INVENTION

Therefore, the present invention provides methods, systems and program products for computing the N most frequent values in a column in a partitioned relational database. In one embodiment of the present invention, a coordinating node is designated from the plurality of nodes across which the table is partitioned. In a first step the coordinating node requests all other participating nodes to process their own partition of the table. Each of these nodes produces a data structure known as an array of counts for the table column for which frequent value statistics were requested. Each of the arrays of counts is then transferred to the coordinating node. The received arrays of counts are combined into a combined array of counts on the coordinating node. The coordinating node then processes its own partition of the table to produce a list of most frequent values in the column of the partitioned table for which frequent value statistics are requested.

In another embodiment of the invention, there is provided a method for computing frequent value statistics in a table column of a relational database partitioned across a plurality of nodes, including at least one coordinator node with at least one associated participating node, said method comprising the steps of hashing values in said column residing on each said associated participating node to create a hash data set on each said associated participating node, transmitting each said hash data set to said coordinator node, combining each said hash data set into a combined hash data set on said coordinator node, hashing values in said table column in a portion of said relational database residing on said coordinator node to update said combined hash data set; and computing a frequent value statistic for said table column from said combined hash data set.

In another embodiment of the invention, there is provided a method for computing frequent value statistics in at least one table column in a parallel relational database partitioned across a plurality of nodes including a plurality of coordinator nodes each with at least one associated participating node, the method comprising the steps of hashing values in said table column residing on each said participating node to create a hash data set on each said participating node, associating each said participating node for each said table column with one of said plurality of coordinator nodes, transmitting each said hash data set to said associated coordinator nodes, combining each said hash data set at each said associated coordinator node into a combined hash data set, hashing values in said table column in a portion of said relational database residing on each said coordinator node to update said combined hash data set; and computing a frequent value statistic for each said table column from each said combined hash data set on each said associated coordinator node.

In still another embodiment of the invention, there is provided a computer system for computing frequent value statistics in at least one table column in a parallel relational database partitioned across a plurality of nodes, including a plurality of coordinator nodes each with at least one associated participating node, the computer system comprising, first hashing means for hashing values in each said table column residing on each said participating node to create a hash data on each said participating node, means for associating each said participating node for each said table column with one of said plurality of coordinator nodes, means for transmitting each said hash data set to each said associated coordinator node, means for combining each said hash data set at each said associated coordinator node into a combined hash data set, second hashing means for hashing values in said table column in a portion of said relational database residing on each said associated coordinator node to update said combined hash data set, and means for computing a frequent value statistic for each said table column in each said combined hash data set on each said coordinator node.

Other aspects and features of the present invention will become apparent to those of ordinary skill in the art upon review of the following description of example embodiments of the present invention in conjunction with the accompanying figures.

BRIEF DESCRIPTION OF THE DRAWINGS

Embodiments of the invention will now be described, by way of example, with reference to the accompanying drawings, in which.

Figure 1A:
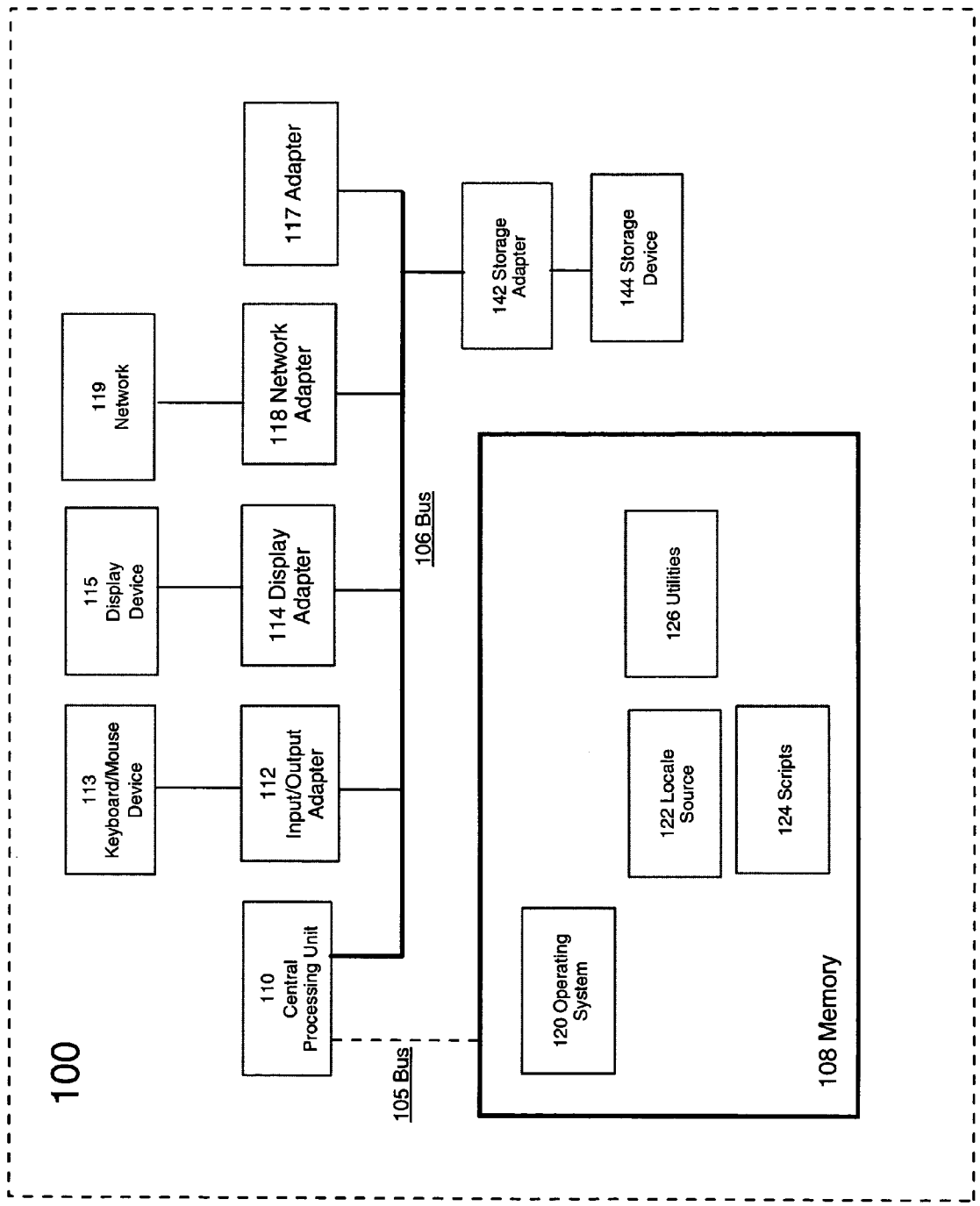
FIG. 1a is a hardware overview of a computer system.

Like reference numerals refer to corresponding components and steps throughout the drawings. It is to be expressly understood that the description and the drawings are only for the purpose of illustration and as an aid to understanding, and are not intended as a definition of the limits of the invention.

DETAILED DESCRIPTION OF THE INVENTION

This invention discloses methods, systems and program products for computing the N most frequent values in a column in a partitioned relational database. In a first example embodiment of the present invention, a coordinating node is designated from the plurality of nodes across which the table is partitioned. In a first step the coordinating node requests all other participating nodes to process their own partition of the table. Each of these nodes produces a data structure known as an array of counts for the table column for which frequent value statistics were requested. Each of the arrays of counts is then transferred to the coordinating node. The received arrays of counts are combined into a combined array of counts on the coordinating node. The coordinating node then processes its own partition of the table to produce a list of most frequent values in the column of the partitioned table for which frequent value statistics are requested.

Advantageously, the technique may be employed across a number of nodes of a partitioned relational database and is general enough to handle the case where a column is the single partitioning key of the database table as well as the case where the column is not the single partitioning key of the database table. Further advantage includes an efficient technique for providing a reliable computation for the most frequent values in a column of a partitioned table.

In a second embodiment of the invention, there is provided a method for computing frequent value statistics in a table column of a relational database partitioned across a plurality of nodes, including at least one coordinator node with at least one associated participating node, said method comprising the steps of hashing values in said column residing on each said associated participating node to create a hash data set on each said associated participating node, transmitting each said hash data set to said coordinator node, combining each said hash data set into a combined hash data set on said coordinator node, hashing values in said table column in a portion of said relational database residing on said coordinator node to update said combined hash data set; and computing a frequent value statistic for said table column from said combined hash data set.

In another embodiment of the invention, there is provided a method for computing frequent value statistics in at least one table column in a parallel relational database partitioned across a plurality of nodes including a plurality of coordinator nodes each with at least one associated participating node, the method comprising the steps of hashing values in said table column residing on each said participating node to create a hash data set on each said participating node, associating each said participating node for each said table column with one of said plurality of coordinator nodes, transmitting each said hash data set to said associated coordinator nodes, combining each said hash data set at each said associated coordinator node into a combined hash data set, hashing values in said table column in a portion of said relational database residing on each said coordinator node to update said combined hash data set; and computing a frequent value statistic for each said table column from each said combined hash data set on each said associated coordinator node.

In still another embodiment of the invention, there is provided a computer system for computing frequent value statistics in at least one table column in a parallel relational database partitioned across a plurality of nodes, including a plurality of coordinator nodes each with at least one associated participating node, the computer system comprising, first hashing means for hashing values in each said table column residing on each said participating node to create a hash data on each said participating node, means for associating each said participating node for each said table column with one of said plurality of coordinator nodes, means for transmitting each said hash data set to each said associated coordinator node, means for combining each said hash data set at each said associated coordinator node into a combined hash data set, second hashing means for hashing values in said table column in a portion of said relational database residing on each said associated coordinator node to update said combined hash data set, and means for computing a frequent value statistic for each said table column in each said combined hash data set on each said coordinator node.

In another embodiment of the invention, there is provided a computer system for computing frequent value statistics in a table column of a relational database partitioned across a plurality of nodes, including a coordinator node with at least one associated participating node, said system comprising, first means for hashing values in said table column residing on each said associated participating node to create a hash data set on each said associated participating node, means for transmitting each said hash data set to said coordinator node, means for combining each said hash data set into a combined hashed data set on said coordinator node, second means for hashing values in said table column in a portion of said relational database residing on said coordinator node to update said combined hashed data set; and means for computing a frequent value statistic for said table column from said combined hashed data set.

Figure 1B:
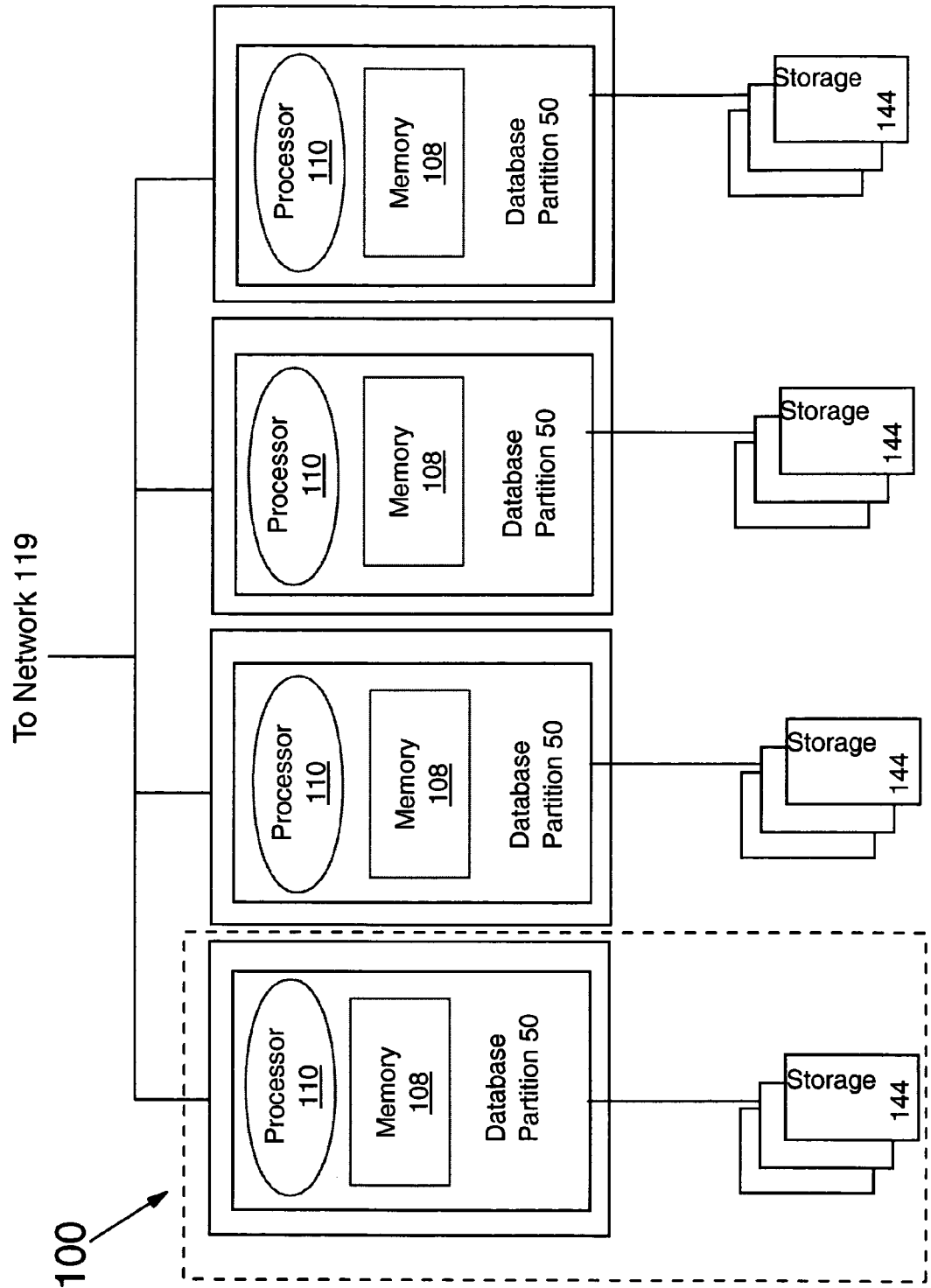
FIG. 1b is an overview of a collection of systems of FIG. 1a, exemplary of an embodiment of the present invention.

FIG. 1a depicts, in a simplified block diagram, a computer system 10 suitable for implementing embodiments of the present invention. Computer system 100 has processor 110, which is a programmable processor for executing programmed instructions stored in memory 108. Memory 108 can also include hard disk, tape or other storage media. While a single CPU is depicted in FIG. 1a, it is understood that other forms of computer systems can be used to implement the invention, including multiple CPUs as in FIG. 1b. It is also appreciated that the present invention can be implemented in a distributed computing environment having a plurality of computers communicating via a suitable network 119, such as the Internet as shown in FIG. 1b.

CPU 110 is connected to memory 108 either through a dedicated system bus 105 and/or a general system bus 106. Memory 108 can be a random access semiconductor memory for storing application data for processing such as that in a database partition. Memory 108 is depicted conceptually as a single monolithic entity but it is well known that memory 108 can be arranged in a hierarchy of caches and other memory devices. FIG. 1a illustrates that operating system 120 may reside in memory 108.

Operating system 120 provides functions such as device interfaces, memory management, multiple task management, and the like as known in the art. CPU 110 can be suitably programmed to read, load, and execute instructions of operating system 120. Computer system 100 has the necessary subsystems and functional components to implement database management functions such as gathering statistics as will be discussed later. Other programs (not shown) include server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology. The Input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM drive although other types of data storage devices can be used, including removable media.

Adapter 117 is used for operationally connecting many types of peripheral computing devices to computer system 100 via bus 106, such as printers, bus adapters, and other computers using one or more protocols including Token Ring, LAN connections, as known in the art. Network adapter 118 provides a physical interface to a suitable network 119, such as the Internet. Network adapter 118 includes a modem that can be connected to a telephone line for accessing network 119. Computer system 100 can be connected to another network server via a local area network using an appropriate network protocol and the network server that can in turn be connected to the Internet. FIG. 1a is intended as an exemplary representation of computer system 100 by which embodiments of the present invention can be implemented. It is understood that in other computer systems, many variations in system configuration are possible in addition to those mentioned here.

FIG. 1b is intended as an exemplary representation of computer systems 100 connected by network means to each other and to Network 119 of FIG. 1a. Each instance of system 100 contains among other components known in the art, processor 110, memory 108 and database partition 50 which is a portion of a relational database table, partitioned across nodes such as system 100. Also connected to system 100 is storage 144 holding information such as application data as well as system configuration data. Each database partition 50 is a well defined fragment of a partitioned relational database table that has been partitioned across a number of systems 100 as shown. Each instance of system 100 is known as a node.

Figure 2:
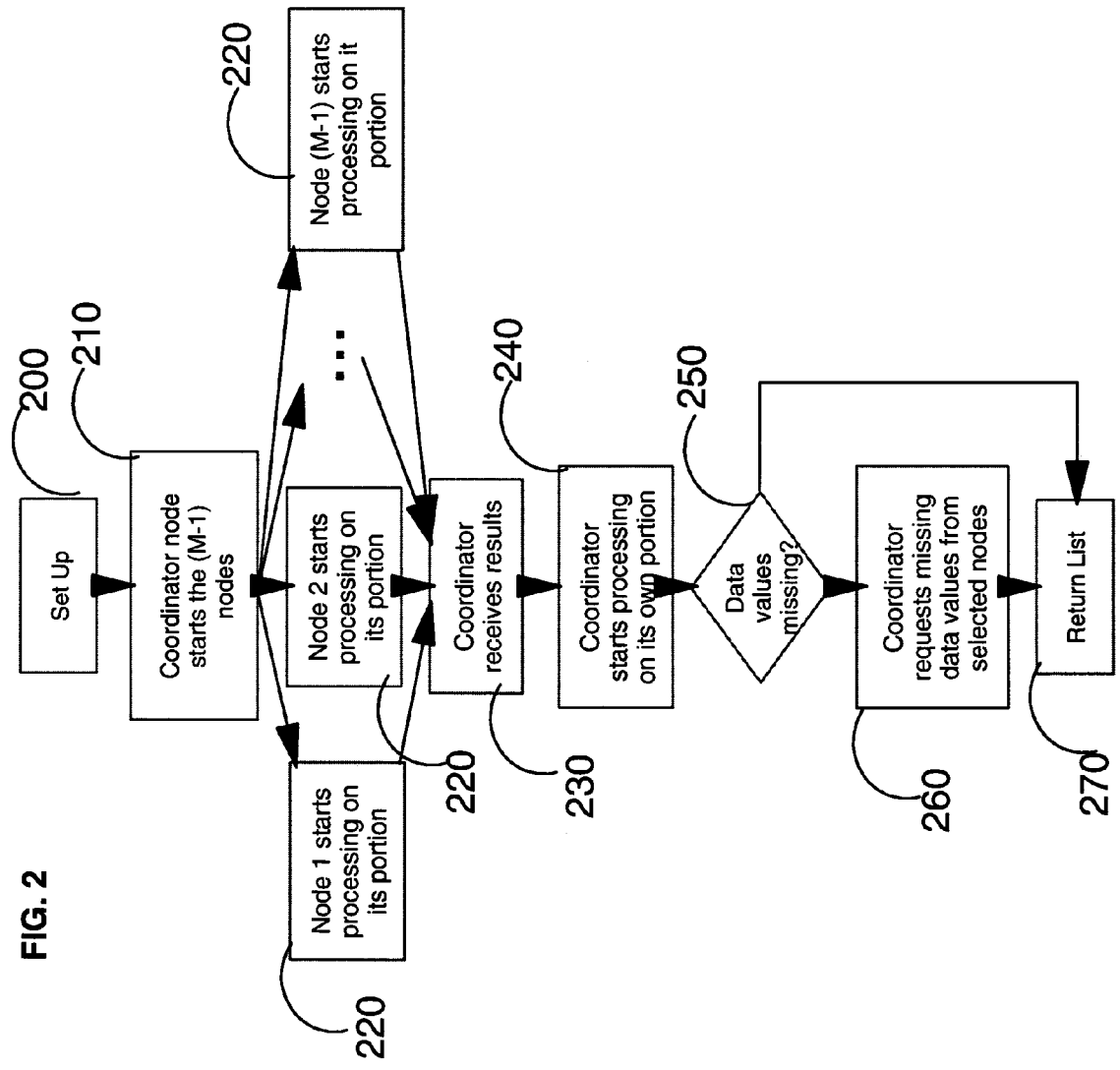
FIG. 2 is a flow diagram of activities performed in an embodiment of the present invention operating in an environment as suggested by FIG. 1a and FIG. 1b.

FIG. 2 is a flowchart describing the steps which are involved in the calculation of frequent value statistics in a column of a partitioned table such as that in FIG. 1b in an embodiment of the invention. As illustrated in 200 of FIG. 2, initialization or set up is performed. Included in this operation, one of the M nodes across which the table of interest is partitioned is selected as the coordinator node. A coordinator node is in communication with a plurality of other nodes which are to participate in the gathering of frequent value statistics for the specified column and table. The role of the coordinator node is to coordinate the activities of the remaining (M−1) nodes, aggregate the partial results sent in by those (M−1) nodes and determine the list of the N most frequent values in the column specified after having processed its own column for a partition of the table of interest. The method of selecting a coordinator node is not of interest to the instant technique. Typically a coordinator node may be selected at random by selecting the node with the most rows of the specific table of interest. In a preferred embodiment the node with the most rows in the table of interest is used as the coordinator node. Selection of a coordinator node, as in a preferred embodiment, increases the probability that the technique of the instant invention does not require additional rounds of communication with the remaining (M−1) nodes to resolve any missing information.

In operation 210, the coordinator node submits a request to the other (M−1) nodes to start processing their respective table partition data. In operation 220 a plurality of (M−1) nodes commence processing their respective partitioned table data. The (M−1) nodes process their partition table data preferably in a substantially parallel manner, but doing so is not required and may be governed by time and circumstance. During operation 220 each one node of the (M−1) nodes reads its partition of the database table and computes a hash data set referred to as an array of counts for the column of interest denoted as "C". This computation involves hashing each value or entry in the column "C". Any selected one of many well known hashing functions may be employed to calculate a hashed value for the input data value. Each node is required to use the same hashing technique and the same size of array of counts for consistency. The result of the hashing function indicates a position in the array of counts, wherein all positions were initially set to zero; Instead of maintaining a bit map, that only indicates the absence or presence of a value, the embodiment includes an array of counts associated with each column. Using the technique of this invention, an element in the array of counts is either zero, (which indicates no data values hashed to the element), or "N", (indicating there were "N" data values that hashed to the element position). For each occurrence of a data value that hashes to the same position in the array of counts, the count value at that position in the array of counts is incremented by one. When all data values in the column "C" have been so hashed, the count in each respective position in the array of counts indicates how many times each unique data value occurred in the column "C". The array of counts only indicates how often a data value occurred in the column "C" and does not contain any of the data values themselves. The array of counts provides a capability to store the result of data value changes in the form of additions and deletions. At an instant in time, the mth entry of the array of counts records the number of data values in a column that have hashed to position m.

Having completed processing its respective partitioned table data a node sends its array of counts information without the need for additional processing by that node to the coordinating node during operation 230. Responsive to the receipt of the array of counts from the respondent other nodes, the coordinator node archives a copy of each received array of counts for later use and then combines the received copies into combined array of counts. Combining the various response arrays into one summarized array of counts is accomplished by having the coordinating node take the value in each position of a respondent other node's array of counts and adding it to the same respective position in the summarized or combined array of counts. The value in a position of the summarized or combined array of counts now represents the combined total of all respectively positioned values of all respondent other nodes.

During operation 240 the coordinating node begins to process its own partition table data in conjunction with the recently formed summarized or combined array of counts to produce a list of N most frequent values. Each member of the list of most frequent values is a record containing three fields, those being the data value, the data value's frequency of occurrence and the data value's position in the summarized array of counts. The coordinating node iterates through the values of the summarized array of counts and inserts into the list of N most frequent values the positions and corresponding number of occurrences of the most frequent values. The coordinating node now uses its own partitioned table data to update the summarized array of counts and the list of most frequent values. When a record in the list is updated and its data value is not known then the data value in the data value field is marked accordingly.

During operation 250 the coordinating node determines if there are any records in which the data value field is marked as having an unknown value. If there are no such unknown values, the list is returned in operation 270. Otherwise, during operation 260, in response to finding an unknown data value, the coordinating node requests a node having a copy of the missing data value to send the coordinating node a copy of the missing data value. In a preferred embodiment, determination of on which node to find the missing value is accomplished by first reading a data value's position "k" in the summarized array of counts for each unknown data value encountered in the list of frequent values. Then the coordinating node searches through the array of counts received from each respondent node checking at position "k" for a non-zero entry. Any of the arrays of counts received from the respondent nodes having a non-zero value at position "k" indicates that the corresponding node processed and sent the "missing" data value entries and is then identified as a candidate node. The coordinating node can select any of the candidate nodes which can therefore satisfy the request for the "missing" data value. Responsive to receipt of missing data values, the coordinator node now returns the completed list as before in operation 270.

Figure 3:
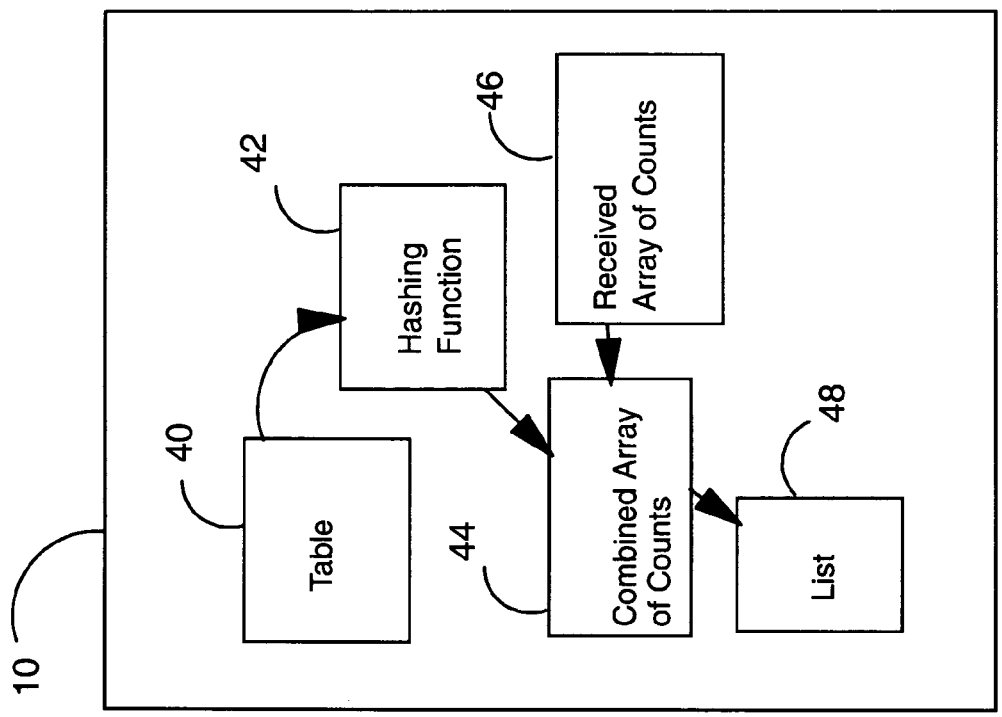
FIG. 3 is a block diagram showing components of a coordinating node of a system of FIG. 1a and FIG. 1b.

Referring now to FIG. 3, components of a coordinating node are shown. A coordinating node as in an embodiment of the invention processes its partition of a database table 40 through a hashing function 42 in conjunction with data received from other nodes. Participating other nodes send their respective arrays of counts to the coordinating node in response to a request from the coordinating node. The received arrays of counts 46 are then summarized or combined by the coordinating node into a combined array of counts 44. Received arrays of counts 46 are saved by the coordinating node for the duration of the frequent value calculation as they may be needed for later processing. It may be appreciated that the coordinator does not have to wait to receive all of the data from the participating nodes to perform the calculation. The combined array of counts can be constructed incrementally and the list of most frequent values depending There from can also be constructed dynamically.

If frequent value statistics were required for a number of columns, a plurality of coordinator nodes could be selected and the process described above executed for each column of interest controlled by a selected associated coordinating node. Typically each designated coordinator node would calculate a frequent value statistic for a specified column. If there are more columns than nodes, at least one coordinator node would then have to calculate frequent value statistics for more than one column. The calculation of each column's frequent value statistics being performed independently of another column's calculations. In this manner frequent value statistics for multiple columns may be calculated in parallel.

Although the invention has been described with reference to example embodiments, it is to be understood that the invention is not limited to these precise embodiments and that various changes and modifications may be effected therein by one skilled in the art. All such changes and modifications are intended to be encompassed in the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method to compute a frequent value statistic, said method comprising:

receiving a request to compute a frequent value statistic of values present in a table column of data values provided in a relational database partitioned across a plurality of nodes, said partitioned relational database including at least one coordinator node with at least one associated participating node, said frequent value statistic representing one or more data values having the highest number of duplicates present in said table column;

hashing values in said table column residing on each said associated participating node to create a hash data set for each said associated participating node, said hash data set comprising an array of counts associated with that table column wherein a result of a hashed value in a column indicates a position in the array of counts; and, for each occurrence of a data value that hashes to the same position in the array of counts, incrementing by one a count value at that position in said array of counts;

transmitting each said array of counts corresponding to said table column from each associated participating node to said coordinator node;

combining each said array of counts from each associated participating node into a combined array of counts for said coordinator node, said combining comprising adding a value from each position in each said array of counts received from each associated participating node to a value in a corresponding position of said combined array of counts;

hashing values in said table column in a portion of said relational database residing on said coordinator node to update said combined array of counts, said value in a position of said combined array of counts representing a combined total of all respectively positioned values of all associated participating nodes; and computing said frequent value statistic representing said one or more data values having the highest number of duplicates present in said table column from said combined array of counts by iterating through the values of said combined array of counts and generating a list of a number N of data values, their corresponding frequency of occurrence, and their corresponding position values in said combined array of counts.

2. The method of claim 1 wherein said step of combining further comprises:

archiving each said array of counts.

3. A method to compute a frequent value statistic, said method comprising:

receiving a request to compute a frequent value statistic for values present in at least one table column of data values provided in a parallel relational database partitioned across a plurality of nodes including a plurality of coordinator nodes and plurality of participating nodes, said frequent value statistic representing one or more data values having the highest number of duplicates present in said table column;

hashing values in said table column residing on each said participating node to create a hash data set for each said participating node, said hash data set comprising an array of counts associated with that table column wherein a result of a hashed value in a column indicates a position in the array of counts; and, for each occurrence of a data value that hashes to the same position in the array of counts, incrementing by one a count value at that position in said array of counts;

creating an associated coordinator node by associating each said participating node for each said table column with one of said plurality of coordinator nodes;

transmitting each said array of counts corresponding to said table column from each associated participating node to said associated coordinator node;

combining each said array of counts from each associated participating node into a combined array of counts, said combining comprising adding a value from each position in each said array of counts received from each associated participating node to a value in a corresponding position of said combined array of counts;

hashing values in said table column in a portion of said relational database residing on each said associated coordinator node to update said combined array of counts, said value in a position of said combined array of counts representing a combined total of all respectively positioned values of all associated participating nodes; and computing said frequent value statistic representing said one or more data values having the highest number of duplicates present in said table column for each said table column from each said combined array of counts for each said associated coordinator node by iterating through the values of said combined array of counts and generating a list of a number N of data values, their corresponding frequency of occurrence, and their corresponding position values in said combined array of counts.

4. The method of claim 3, wherein said step of combining further comprises:
archiving each said array of counts.

5. A computer program storage device, readable by machine, tangibly embodying a program of instructions executable by a machine to compute a frequent value statistic for values present in at least one table column of data values provided in a parallel relational database partitioned across a plurality of nodes, including a plurality of coordinator nodes and a plurality of participating nodes, the frequent value statistic representing one or more data values having the highest number of duplicates in said table column, the computer program storage device comprising:

first hashing means for hashing values in said table column residing on each said participating node to create a hash data set for each said participating node, said hash data set comprising an array of counts associated with that table column wherein a result of a hashed value in a column indicates a position in the array of counts; and, for each occurrence of a data value that hashes to the same position in the array of counts, incrementing by one a count value at that position in said array of counts;

means for creating an associated coordinator node by associating each said participating node for each said table column with one of said plurality of coordinator nodes;

means for transmitting each said array of counts corresponding to said table column from each associated participating node to said associated coordinator node;

means for combining each said array of counts from each associated participating node into a combined array of counts, said combining comprising adding a value from each position in each said array of counts received from each associated participating node to a value in a corresponding position of said combined array of counts;

second hashing means for hashing values in said table column in a portion of said relational database residing on each said associated coordinator node to update said combined array of counts, said value in a position of said combined array of counts representing a combined total of all respectively positioned values of all associated participating nodes; and means for computing a frequent value statistic representing said one or more data values having the highest number of duplicates present in said table column for each said table column in each said combined array of counts for each said coordinator node by iterating through the values of said combined array of counts and generating a list of a number N of data values, their corresponding frequency of occurrence, and their corresponding position values in said combined array of counts.

6. The system of claim 5, wherein said means for combining further comprises:
means for archiving each said array of counts.

7. A computer program storage device, readable by machine, tangibly embodying a program of instructions executable by a machine to compute a frequent value statistic for values present in a table column of data values provided in a relational database partitioned across a plurality of nodes, including a coordinator node wit at least one associated participating node, the frequent value statistic representing one or more data values having the highest number of duplicates in said table column, said computer program storage device comprising:

first means for hashing values in said table column residing on each said associated participating node to create a hash data set for each said associated participating node, said hash data set comprising an array of counts associated with that table column wherein a result of a hashed value in a column indicates a position in the array of counts; and, for each occurrence of a data value that hashes to the same position in the array of counts, incrementing by one a count value at that position in said array of counts;

means for transmitting each said array of counts corresponding to said table column from each associated participating node to said coordinator node;

means for combining each said array of counts from each associated participating node into a combined array of counts, said combining comprising adding a value from each position in each said array of counts received from each associated participating node to a value in a corresponding position of said combined array of counts for said coordinator node;

second means for hashing values in said table column in a portion of said relational database residing on said coordinator node to update said combined array of counts, said value in a position of said combined array of counts representing a combined total of all respectively positioned values of all associated participating nodes; and means for computing said frequent value statistic representing said one or more data values having the highest number of duplicates present in said table column from said combined array of counts by iterating through the values of said combined array of counts and generating a list of a number N of data values, their corresponding frequency of occurrence, and their corresponding position values in said combined array of counts.

8. The system of claim 7 wherein said means for combining further comprises:
means for archiving each said array of counts.

9. The method of claim 1, wherein said list is used by a query optimization component of a database management system.

10. The system of claim 5, wherein said list is used by a query optimization component of a database management system.

11. An article of manufacture comprising a computer usable medium having computer readable program code means embodied therein to compute a frequent value statistic, the computer readable program code means in said article of manufacture comprising computer readable program code means for causing a computer to effect the step of computing a frequent value statistic of values present in a table column of data values provided in a relational database partitioned across a plurality of nodes, including at least one coordinator node with at least one associated participating node, the frequent value statistic representing one or more data values having the highest number of duplicates in said table column, said step of computing comprising the steps of:

hashing values in said column residing on each said associated participating node to create a hash data set for each said associated participating node, said hash data set comprising an array of counts associated with that table column wherein a result of a hashed value in a column indicates a position in the array of counts; and, for each occurrence of a data value that hashes to the same position in the array of counts, incrementing by one a count value at that position in said array of counts;

transmitting each said array of counts corresponding to said table column from each associated participating node to said coordinator node;

combining each said array of counts from each associated participating node into a combined array of counts, said combining comprising adding a value from each position in each said array of counts received from each associated participating node to a value in a corresponding position of said combined array of counts for said coordinator node;

hashing values in said table column in a portion of said relational database residing on said coordinator node to update said combined array of counts, said value in a position of said combined array of counts representing a combined total of all respectively positioned values of all associated participating nodes; and computing said frequent value statistic representing said one or more data values having the highest number of duplicates present in said table column from said combined array of counts by iterating through the values of said combined array of counts and generating a list of a number N of data values, their corresponding frequency of occurrence, and their corresponding position values in said combined array of counts.

12. A program storage device readable by machine, embodying a program of instructions executable by the machine to perform method steps to compute a frequent value statistic, said method steps comprising The steps of claim 1.

13. An article of manufacture comprising a computer usable medium having computer readable program code means embodied therein for causing computation of a frequent value statistic, the computer readable program code means in said article of manufacture comprising computer readable program code means for causing a computer to effect the step of computing a frequent value statistic for values present in a least one table column of data values provided in a parallel relational database partitioned across a plurality of nodes including a plurality of coordinator nodes and plurality of participating nodes, the frequent value statistic representing one or more data values having the highest number of duplicates in said table column, the step of computing comprising the steps of:

hashing values in said table column residing on each said participating node to create a hash data set for each said participating node, said hash data set comprising an array of counts associated with that table column wherein a result of a hashed value in a column indicates a position in the array of counts; and, for each occurrence of a data value that hashes to the same position in the array of counts, incrementing by one a count value at that position in said array of counts;

creating an associated coordinator node by associating each said participating node for each said table column with one of said plurality of coordinator nodes;

transmitting each said array of counts corresponding to said table column from each associated participating node to said associated coordinator node;

combining each said array of counts from each associated participating node into a combined array of counts, said combining comprising adding a value from each position in each said array of counts received from each associated participating node to a value in a corresponding position of said combined array of counts;

hashing values in said table column in a portion of said relational database residing on each said associated coordinator node to update said combined array of counts, said value in a position of said combined array of counts representing a combined total of all respectively positioned values of all associated participating nodes; and computing said frequent value statistic representing said one or more data values having the highest number of duplicates present in said table column for each said table column from each said combined array of counts by iterating through the values of said combined array of counts and generating a list of a number N of data values, their corresponding frequency of occurrence, and their corresponding position values in said combined array of counts for each said associated coordinator node.

14. A program storage device readable by machine, embodying a program of instructions executable by the machine to perform method steps to compute a frequent value statistic, said method steps comprising the steps of claim 3.

15. A computer program storage device, readable by machine, tangibly embodying a program of instructions executable by a machine to cause computation of a frequent value statistic representing one or more data values having the highest number of duplicates present in a table column provided in a database, said database partitioned across a plurality of nodes, including a coordinator node with at least one associated participating node, the computer program storage device to effect the functions of:

first hashing means for hashing values in said table column residing on each said participating node to create a hash data for each said participating node, said hash data set comprising an array of counts associated with that table column wherein a result of a hashed value in a column indicates a position in the array of counts; and, for each occurrence of a data value that hashes to the same position in the array of counts, incrementing by one a count value at that position in said array of counts;

means for creating an associated coordinator node by associating each said participating node for each said table column with one of said plurality of coordinator nodes;

means for transmitting each said array of counts corresponding to said table column from each associated participating node to said associated coordinator node;

means for combining each said array of counts from each associated participating node into a combined array of counts, said combining comprising adding a value from each position in each said array of counts received from each associated participating node to a value in a corresponding position of said combined array of counts;

second hashing means for hashing values in said table column in a portion of said relational database residing on each said associated coordinator node to update said combined array of counts, said value in a position of said combined array of counts representing a combined total of all respectively positioned values of all associated participating nodes; and means for computing a frequent value statistic representing said one or more data values having the highest number of duplicates present in said table column for each said table column in each said combined array of counts by iterating through the values of said combined array of counts and generating a list of a number N of data values, their corresponding frequency of occurrence, and their corresponding position values in said combined array of counts for each said coordinator node.

16. A computer program storage device, readable by machine, tangibly embodying a program of instructions executable by a machine to cause computation of a frequent value statistic for values present in a table column of a relational database partitioned across a plurality of nodes, including a coordinator node with at least one associated participating node, the frequent value statistic representing one or more data values having the highest number of duplicates in said table column, the computer program storage device to effect the functions of:

first means for hashing values in said table column residing on each said associated participating node to create a hash data set for each said associated participating node, said hash data set comprising an array of counts associated with that table column wherein a result of a hashed value in a column indicates a position in the array of counts; and, for each occurrence of a data value that hashes to the same position in the array of counts, incrementing by one a count value at that position in said array of counts;

means for transmitting each said array of counts corresponding to said table column from each associated participating node to said coordinator node;

means for combining each said array of counts from each associated participating node into a combined array of counts, said combining comprising adding a value from each position in each said array of counts received from each associated participating node to a value in a corresponding position of said combined array of counts for said coordinator node;

second means for hashing values in said table column in a portion of said relational database residing on said coordinator node to update said combined array of counts, said value in a position of said combined array of counts representing a combined total of all respectively positioned values of all associated participating nodes; and means for computing a frequent value statistic representing said one or more data values having the highest number of duplicates present in said table column from said combined array of counts by iterating through the values of said combined array of counts and generating a list of a number N of data values, their corresponding frequency of occurrence, and their corresponding position values in said combined array of counts.

* * * * *